R. PENTONY.
UNIVERSAL JOINT.
APPLICATION FILED AUG. 17, 1916.
1,210,200.
Patented Dec. 26, 1916.
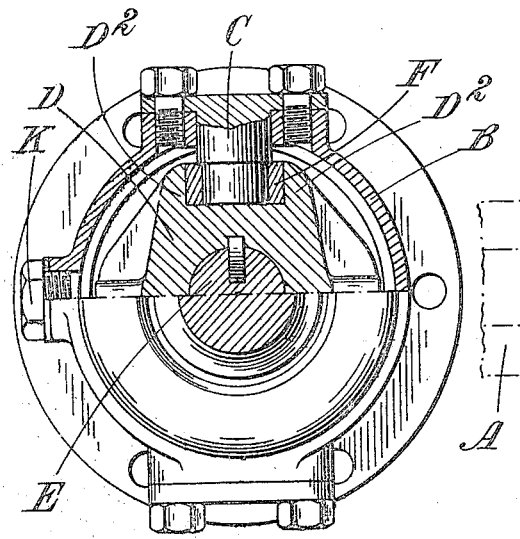
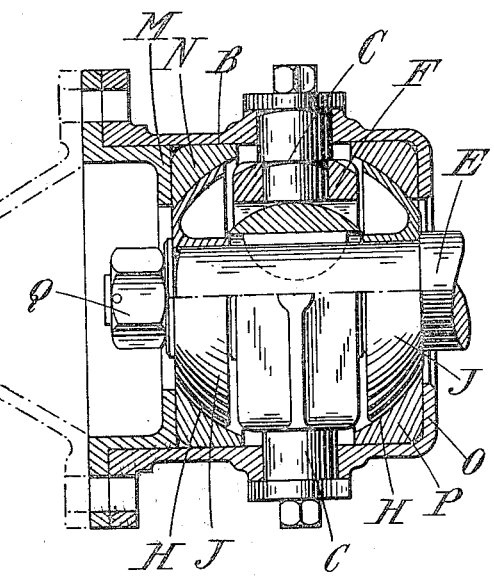
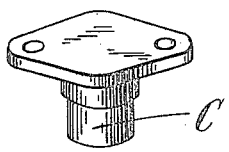
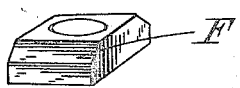
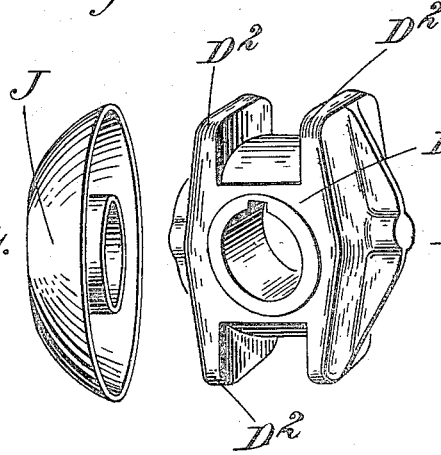
Inventor:
Richard Pentony

UNITED STATES PATENT OFFICE.

RICHARD PENTONY, OF STAFFORD, ENGLAND.

UNIVERSAL JOINT.

1,210,200.     Specification of Letters Patent.     Patented Dec. 26, 1916.

Application filed August 17, 1916. Serial No. 115,370.

*To all whom it may concern:*

Be it known that I, RICHARD PENTONY, a subject of the King of Great Britain, residing at Stafford, in the county of Stafford, England, have invented a certain new and useful Universal Joint, of which the following is a specification.

This invention relates to universal joints of the type in which one shaft carries an inner member which is parti-spherical or wholly spherical and this engages the interior of a correspondingly formed housing on the other shaft, while the housing carries driving pins which engage slots or the equivalent on the inner member.

It is the object of the present invention to provide an improved construction in which the chief working parts can be easily adjusted and all the parts liable to wear can be replaced in detail without renewing the larger parts of the joint.

The accompanying drawings show one method of carrying out this invention.

In these, Figure 1 is a part longitudinal section. Fig. 2 is a part sectional end view of the same. Fig. 3 is a perspective view of the fork member. Fig. 4 is a corresponding view of one of the washers. Fig. 5 is a corresponding view of one of the driving pins, and Fig. 6 is a perspective view of one of the bearing blocks which may be used.

Like letters indicate like parts throughout the drawings.

In the construction illustrated, there is attached to a flange on the one shaft A, which may be the driving shaft, a cylindrical casing B which constitutes one member of the joint. This member B carries in any suitable manner a number of driving pins C each of which projects between the parts $D^2$ of one side of the fork member D fixed to the second shaft E, which may be assumed to be the driven shaft. The pins C can be clearly seen in Fig. 2, and transmit rotation from the driving member B to the driven shaft E through the fork member D which is keyed or similarly fixed thereto. If desired the end of each pin C may carry a bearing block F which lies in the channel between the projecting parts $D^2$ and affords a large bearing surface which can be easily renewed in the event of wear taking place.

The interior of the member B may carry or be formed with parti-spherical surfaces H, which in the preferred construction shown in Fig. 1 are formed upon separate rings N and P inside the casing B. These parti-spherical surfaces are engaged by parti-spherical washers J fixed upon the shaft E and held in place by the nut Q as will be clear. These washers prevent any shake or movement between the inner and outer members of the universal joint and it will be obvious that the bearing surfaces of these parts can be made very large.

Preferably the casing member B is made to contain lubricant which can be admitted through an orifice closed by the plug K, and this lubricant will, when the joint revolves, be thrown by centrifugal action outward on to the bearing surfaces.

It will be seen that as the joint is completely closed it can be used under water if necessary. Also, it is a form of joint which can be used to take end thrust and radial loads as is the case when the joint is used at the forward end of the propeller shaft of a motor car when arrangements are made for the rear axle torque to be transmitted through the universal joint. Another important feature is that the complete joint can be removed without requiring to be taken to pieces and, conversely, it can be fitted in an assembled condition. Thus by disconnecting the casing B from its shaft A and by removing the nut Q the complete joint can be moved to the left, or conversely, the shaft E to the right, provided that the shaft is splined.

All the wearing parts can easily be renewed and furthermore most of the slackness that may arise due to wear can be taken up without replacement being necessary. Thus the two washers J can be separated by means of packing interposed between either and the member D, or conversely, shims can be inserted between the parts M and N or between the parts O and P, or at both points shims may be used. The washers J are loose and either or both can be easily renewed.

What I claim as my invention, and desire to secure by Letters Patent, is:—

1. In a universal joint, an outer casing member having parti-spherical inner surfaces, an inner forked member, driving pins on said outer member engaging said inner member, and loose parti-spherical washers engaging said surfaces, substantially as set forth.

2. In a universal joint, an outer casing member, an inner forked member, driving pins on said outer member engaging said inner member, loose rings on the interior of said outer member having parti-spherical surfaces, and loose parti-spherical washers engaging said rings, substantially as set forth.

3. In a universal joint, an outer casing member having parti-spherical inner surfaces, a shaft entering said casing, a forked inner member on said shaft, driving pins on said outer member engaging said forked member, and loose parti-spherical washers on said shaft engaging said surfaces, substantially as set forth.

In testimony whereof I have signed my name to this specification in the presence of two subscribing witnesses.

RICHARD PENTONY.

Witnesses:
ERNEST PARKER,
DAVID C. KERR.